United States Patent Office 2,891,996
Patented June 23, 1959

2,891,996

2,4-DIHYDROXY BENZOPHENONE DERIVATIVES

Gerald A. Clark, Midland, and Carl B. Havens, Hope, Mich., assignors to The Dow Chemical Company, Midland, Mich., a corporation of Delaware No Drawing. Application April 23, 1956
Serial No. 579,771

3 Claims. (Cl. 260—591)

This invention relates to new organic compounds and to polymeric compositions containing the same. More particularly, it relates to new organic compounds finding utility as light stabilizers for haloethylene polymers.

Haloethylene polymers are known to be highly sensitive to the effects of elevated temperatures and of light and under prolonged exposure to heat and light may become so degraded as to be commercially useless. It has been common practice to blend certain compounds with the polymer to stabilize it against the degradative effects of heat and light. Several of such compounds, however, are colored materials which impart an objectionable initial color to the stabilized composition and thus prevent the production of a commercially salable white composition.

Still other disadvantages of many of the previous compounds are a high odor level and volatility. Obviously, any odor in the stabilizer will be transferred to the stabilized composition. When volatile stabilizers are employed, the stabilizers volatilize out of the composition, leaving the composition in time unprotected against the degradative effects of light, particularly ultra-violet light. In addition, all of the compounds vary in their ability to absorb ultra-violet light and it is impossible to predict the effectiveness of any particular compound with any degree of certainty, and some of the compounds lose some of their effectiveness for absorbing ultra-violet light over a prolonged period of time.

In view of the above problems it would be desirable and it is the principal object of this invention to provide a new group of organic compounds having the stated utility.

It is a further object to provide a polymeric composition stabilized against the degradative effects of light by means of such compounds.

It is a still further object to provide a group of such compounds which have little or no color and have a low odor level.

Another object is to provide a group of such compounds which have low volatility.

The above and related objects are achieved by means of a group of 2,4-dihydroxy benzophenone derivatives having the general formula:

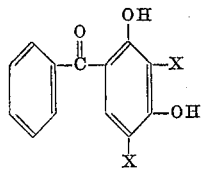

wherein one X is an organic acyl group having from 1 to 8 carbon atoms and the remaining X is selected from the group consisting of hydrogen and organic acyl groups having from 1 to 8 carbon atoms. The invention likewise includes stabilized thermoplastic compositions comprising such compounds and haloethylene polymers.

As typical examples of the compounds which are within the scope of this invention may be mentioned:

3-acetyl-2,4-dihydroxy benzophenone
5-acetyl-2,4-dihydroxy benzophenone
3,5-diacetyl-2,4-dihydroxy benzophenone
3-acetyl-5-benzoyl-2,4-dihydroxy benzophenone
3-benzoyl-5-acetyl-2,4-dihydroxy benzophenone
3-butyryl-2,4-dihydroxy benzophenone
3-caprylyl-2,4-dihydroxy benzophenone
3-benzoyl-5-caprylyl-2,4-dihydroxy benzophenone
3,5-dibutyryl-2,4-dihydroxy benzophenone
3,5-dicaprylyl-2,4-dihydroxy benzophenone The compounds are easily prepared from readily available materials. As a typical example of their preparation the procedure for preparing 3-acetyl-2,4-dihydroxy benzophenone will be described. A reaction mixture consisting of 0.25 mole of acetyl chloride, 0.25 mole of 4-benzoyl resorcinol, and 0.5 mole aluminum chloride in 250 mls. of orthodichlorobenzene was heated to 120° C. for one hour. The reaction mixture was then cooled and poured into cold dilute HCl. The solvent was removed by distillation and the product distilled in vacuo at 0.5 mm. Hg. The fraction boiling at 180°–187° C. was collected, cooled, and recrystallized three times from 95 percent ethyl alcohol. The 2-acetyl-4-benzoyl resorcinol was in the form of pale yellow crystals melting at 99.5 to 100° C. The compound 3,5-diacetyl-2,4-dihydroxy benzophenone prepared in a similar manner was found to be a white crystalline solid melting at 151°–151.5° C.

The compounds of this invention were evaluated as light stabilizers for haloethylene polymers. Because of their low degree of odor and color they produced compositions that were more merchandisable than compositions prepared from previous stabilizers. The effectiveness of the stabilizers will be more apparent from the following illustrative example wherein all parts are by weight.

*Example*

A series of samples was prepared from a basic formulation consisting of 89.3 parts of a copolymer prepared from 85 percent vinylidene chloride and 15 percent vinyl chloride, 7 parts of a pentaerythritol tetraester of a mixture of saturated fatty acids (ave. chain length=6) as a plasticizer, 1.7 parts of a phosphate heat stabilizer, and 1 part titanium dioxide as a pigment. One sample was left as a blank for comparison. To another was added 1 part of 2-hydroxy-5-chlorobenzophenone, a known light stabilizer. To the others was added one part of the stabilizer of this invention. The samples were compression molded to form sheets 0.01 inch thick. The moldings were exposed to direct sunlight in the State of Arizona until an arbitrary standard of browning had been reached. The results are listed in the following table:

| Stabilizer | Ultra-violet sun hours to reach standard browning |
|---|---|
| None | 325 |
| 2-hydroxy-5-chlorobenzophenone | 400 |
| 3-acetyl-2,4-dihydroxy benzophenone | >750 |
| 3,5-diacetyl-2,4-dihydroxy benzophenone | >750 |

It can be seen that the compounds of this invention are about twice as effective as light stabilizers as is one of the most effective previously known compounds.

The compounds will stabilize other haloethylene polymers including vinylidene chloride polymers and copolymers and vinyl chloride polymers and copolymers. The most useful range of concentration of the new compounds in such compositions is from 0.25 to 6 percent by weight.

We claim:

1. As a new organic compound, a benzophenone derivative having the general formula:

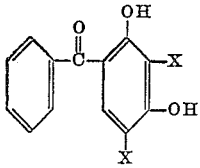

wherein one X is an organic acyl group derived from an aliphatic carboxylic acid having from 1 to 8 carbon atoms and the remaining X is selected from the group consisting of hydrogen and organic acyl groups derived from an aliphatic carboxylic acid having from 1 to 8 carbon atoms.

2. A compound having the formula:

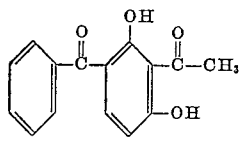

characterized by being a pale yellow solid and having a melting point of 99.5–100° C.

3. A compound having the formula:

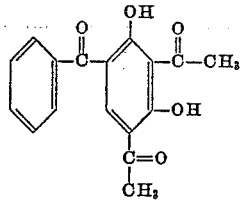

characterized by being a white crystalline solid having a melting point of 151–151.5° C.

References Cited in the file of this patent

UNITED STATES PATENTS

| | | |
|---|---|---|
| 2,264,291 | Boyer | Dec. 2, 1941 |
| 2,613,209 | Beniers | Oct. 7, 1952 |
| 2,659,709 | Fenwick | Nov. 17, 1953 |
| 2,686,812 | Wynn | Aug. 17, 1954 |
| 2,693,492 | Hoch | Nov. 2, 1954 |
| 2,794,052 | Gordon et al. | May 28, 1957 |

OTHER REFERENCES

Perkin et al.: Chem. Abstracts, vol. 1, p. 577 (1907).

Bogert et al.: J. Am. Chem. Soc., vol. 52, pp. 837–50 (1930).

Wittig et al.: Chem. Abstracts, vol. 25, p. 3634 (1931).

Dischendorfer et al.: Chem. Abstracts, vol. 30, pp. 443–4 (1936).